United States Patent
Methe et al.

(10) Patent No.: US 7,116,846 B2
(45) Date of Patent: Oct. 3, 2006

(54) ATHERMAL FIBER BRAGG GRATING

(75) Inventors: Joseph A. Methe, San Jose, CA (US);
Pey Schuan Jian, San Jose, CA (US);
Peiti Su, San Jose, CA (US); David W. Wang, Saratoga, CA (US); John C. Tsai, Saratoga, CA (US)

(73) Assignee: Fibera, Inc., Santa Clara, CA (US)

( * ) Notice: Subject to any disclaimer, the term of this patent is extended or adjusted under 35 U.S.C. 154(b) by 0 days.

(21) Appl. No.: 10/906,289

(22) Filed: Feb. 11, 2005

(65) Prior Publication Data

US 2005/0259920 A1 Nov. 24, 2005

Related U.S. Application Data

(60) Provisional application No. 60/521,053, filed on Feb. 12, 2004.

(51) Int. Cl.
*G02F 1/295* (2006.01)
*G02B 6/34* (2006.01)

(52) U.S. Cl. .................. 385/5; 385/4; 385/31; 385/37; 385/39

(58) Field of Classification Search .................. 385/37, 385/5
See application file for complete search history.

(56) References Cited

U.S. PATENT DOCUMENTS

| | | | | |
|---|---|---|---|---|
| 5,991,483 A * | 11/1999 | Engelberth | .................... | 385/37 |
| 5,999,671 A * | 12/1999 | Jin et al. | ...................... | 385/37 |
| 6,101,301 A * | 8/2000 | Engelberth et al. | ........... | 385/37 |
| 6,112,553 A * | 9/2000 | Poignant et al. | ............... | 65/41 |
| 6,181,851 B1 * | 1/2001 | Pan et al. | ..................... | 385/37 |
| 6,282,340 B1 * | 8/2001 | Nasu et al. | .................... | 385/37 |
| 6,349,165 B1 * | 2/2002 | Lock | ........................... | 385/136 |
| 6,363,089 B1 * | 3/2002 | Fernald et al. | ................ | 372/20 |
| 6,377,727 B1 * | 4/2002 | Dariotis et al. | ............... | 385/37 |
| 6,449,402 B1 * | 9/2002 | Bettman et al. | .............. | 385/15 |
| 6,453,108 B1 * | 9/2002 | Sirkis | ......................... | 385/136 |
| 6,493,486 B1 * | 12/2002 | Chen | ........................... | 385/37 |
| 6,621,957 B1 * | 9/2003 | Sullivan et al. | ............... | 385/37 |
| 6,807,341 B1 * | 10/2004 | Albert | ......................... | 385/37 |
| 6,839,487 B1 * | 1/2005 | Boitel et al. | ................... | 385/37 |
| 6,859,584 B1 * | 2/2005 | Johnson et al. | ............... | 385/37 |
| 2002/0009279 A1 * | 1/2002 | Maron et al. | ................ | 385/137 |
| 2002/0118922 A1 * | 8/2002 | Long | ........................... | 385/37 |
| 2002/0122624 A1 * | 9/2002 | Jang | ............................ | 385/37 |
| 2002/0141700 A1 * | 10/2002 | Lachance et al. | ............. | 385/37 |
| 2002/0141701 A1 * | 10/2002 | Boitel et al. | .................. | 385/37 |

(Continued)

Primary Examiner—Brian Healy
Assistant Examiner—Ryan Lepisto
(74) Attorney, Agent, or Firm—Raymond E. Roberts; Intellectual Property Law Offices

(57) ABSTRACT

An a thermal fiber Bragg grating assembly. A platform provides two attachment locations and has a first coefficient of thermal expansion. A stick provides two ends and has a second coefficient of thermal expansion. A fiber Bragg grating provides two ends and has effective third coefficient of thermal expansion. One stick end is fixed to one grating end, the other stick end is fixed to one attachment location, and the other grating end is fixed to the other attachment location. The stick has a same cross-section area along its length that is equal to or less than the cross-section area of the grating. And the coefficients and lengths between respective locations and ends are such that the assembly exhibits an effective overall coefficient of thermal expansion approaching zero.

20 Claims, 5 Drawing Sheets

U.S. PATENT DOCUMENTS

| | | | |
|---|---|---|---|
| 2002/0150335 A1* | 10/2002 | Lachance et al. | 385/37 |
| 2003/0007751 A1* | 1/2003 | Shinozaki et al. | 385/92 |
| 2003/0016910 A1* | 1/2003 | Shinozaki et al. | 385/37 |
| 2003/0026534 A1* | 2/2003 | Skull et al. | 385/27 |
| 2003/0039448 A1* | 2/2003 | Ting et al. | 385/43 |
| 2003/0108287 A1* | 6/2003 | Wang et al. | 385/37 |
| 2003/0108288 A1* | 6/2003 | Bulman et al. | 385/37 |
| 2004/0013364 A1* | 1/2004 | Johnson et al. | 385/37 |
| 2004/0105618 A1* | 6/2004 | Lee et al. | 385/37 |
| 2004/0161197 A1* | 8/2004 | Pelletier et al. | 385/37 |
| 2004/0218861 A1* | 11/2004 | Vincelette | 385/37 |
| 2004/0218863 A1* | 11/2004 | Skull et al. | 385/37 |
| 2005/0013540 A1* | 1/2005 | Huang | 385/37 |
| 2005/0058395 A1* | 3/2005 | Gagnon | 385/37 |

* cited by examiner

Temperature response of a FBG before and after treatment

ATHERMAL FIBER BRAGG GRATING

CROSS-REFERENCE TO RELATED APPLICATIONS

This application claims the benefit of U.S. Provisional Application No. 60/521,053, filed Feb. 12, 2004, hereby incorporated by reference in its entirety.

TECHNICAL FIELD

The present invention relates generally to optical waveguides, and more particularly wherein an optical waveguide is combined with an interface element which permits efficient transfer of light into or out of the waveguide with coupling performed by a diffraction grating.

BACKGROUND ART

Due to its ease of use the fiber Bragg grating ("FBG") has been well accepted by the telecommunications and optical research communities for use in applications as a signal purifier and strain gauge. FBG-based devices, however, are sensitive to temperature and strain along the grating primary axis, which affects the resonance wavelength of the FBG. First, the optical fiber has a thermal expansion effect of its own. Second, the refractive index of the optical fiber also varies with temperature. In order to achieve more accurate measurement, the grating portions of such devices need to be athermal, but preferred materials for a FBG do not inherently have this characteristic. Fortunately, both the thermal expansion coefficient and the refractive index are linearly related to temperature, and by proper design thermal effects on an FBG can be minimized.

The resonance wavelength for an FBG follows the equation:

$$\lambda_B = 2n_{eff}\Lambda, \quad \text{Eq. 1}$$

where $\lambda_B$ is the resonance wavelength, and $\Lambda$ is the Bragg grating period. Thus, the variation to the resonance wavelength becomes:

$$\text{Eq. 2:} \quad \Delta\lambda_B / \Delta T = 2(\Delta n_{eff} / \Delta T)\Lambda + 2n_{eff}(\Delta\Lambda / \Delta T)$$
$$= 2\Lambda((\Delta n_{eff} / \Delta T) + 2n_{eff}(\Delta\Lambda / \Delta T)/\Lambda).$$

The term $(\Delta n_{eff}/\Delta T)$ is the temperature coefficient of refractive index and $(\Delta\Lambda/\Delta T)/\Lambda)$ is the coefficient of thermal expansion of the optical fiber.

The thermal expansion coefficient for the optical fiber is approximately $0.55 \times 10^{-6}$/°C. and the exact value can usually be found from manufacturers' data sheets. The term $(\Delta n_{eff}/\Delta T)$, however, is less often provided by manufacturers and therefore usually needs to be verified experimentally.

For example, the inventors have conducted experiments in which they have gotten a value of $dn_{eff}/dT = 9.8 \times 10^{-6}$/°C. Per Eq. 2, this gives the total variation of:

$$\Delta\lambda_B / \Delta T = 2\Lambda((\Delta n_{eff} / \Delta T) + n_{eff}(\Delta\Lambda / \Delta T)/\Lambda)$$
$$= 2 \times 0.5 \ \mu m \times (9.8 \times 10 - 6/°C + 1.448 \times 0.55 \times 10^{-6}/°C)$$
$$= 10.6 \ pm/°C$$

where $n_{eff} = 1.448$ and $\Lambda = 0.5 \ \mu m$ are used.

To make a device athermal means to make the term $\Delta\lambda_B/\Delta T$ vanish. It is obvious, however, that this cannot be accomplished by using optical fiber alone. Therefore, a new approach is needed.

DISCLOSURE OF INVENTION

Accordingly, it is an object of the present invention to provide an athermal fiber Bragg grating.

Briefly, a preferred embodiment of the present invention is an athermal fiber Bragg grating assembly. A platform of a first material is provided that has a first coefficient of thermal expansion ($\alpha_1$) between first and second attachment locations separated by an attachment-length ($L_1$). A "stick" of a second material is provided that has a second coefficient of thermal expansion ($\alpha_2$) between first and second ends separated by a stick-length ($L_2$). A fiber Bragg type grating of a third material is provided that has an effective third coefficient of thermal expansion ($\alpha_3$) between first and second ends separated by a grating-length ($L_3$), where this "effective" third coefficient is based on a combination of thermal expansion and refractive index variation in the grating with respect to temperature. The second end of the stick is fixed to the first end of the grating, the first end of the stick is fixed to the first attachment location, and the second end of the grating is fixed to the second attachment location. The stick also has an essentially same cross-sectional stick-area along its stick-length, the grating has a cross-sectional grating-area at its first end, and the stick-area is equal to or less than the grating-area. The coefficients ($\alpha_1$, $\alpha_2$, and $\alpha_3$) and The lengths ($L_1$, $L_2$, and $L_3$) are such that the assembly exhibits an effective overall coefficient of thermal expansion ($\alpha$ALL) per the equation:

$$\alpha\text{ALL} = (\alpha_1 * L_1 + \alpha_3 * L_3 - \alpha_2 * L_2)/L_3 \approx 0.$$

An advantage of the present invention is it does provide athermal fiber Bragg gratings, wherein the gratings are both athermal over relatively long periods of time as well as being such when temperatures change over relatively short periods of time.

Another advantage of the invention is that it can be made of relatively inexpensive and common materials.

And another advantage of the invention is that it can be enhanced with optional elements such as a Fabry-Perot filter or a mechanical gain controller to extend the range of applications in which the invention can provide benefits.

These and other objects and advantages of the present invention will become clear to those skilled in the art in view of the description of the best presently known mode of carrying out the invention and the industrial applicability of the preferred embodiment as described herein and as illustrated in the figures of the drawings.

BRIEF DESCRIPTION OF THE DRAWINGS

The purposes and advantages of the present invention will be apparent from the following detailed description in conjunction with the appended figures of drawings in which:

FIG. 3a–b are graphs showing suitability of the AFBG to establish an "optical ruler", wherein FIG. 3a shows the response of an AFBG with a central frequency of 191,700

GHz connected with an athermal Fabry-Perot ITU filter with 50 Ghz channel spacing and FIG. 3b shows the thermal stability of the AFBG in this role.

In the various figures of the drawings, like references are used to denote like or similar elements or steps.

BEST MODE FOR CARRYING OUT THE INVENTION

Figure 1:
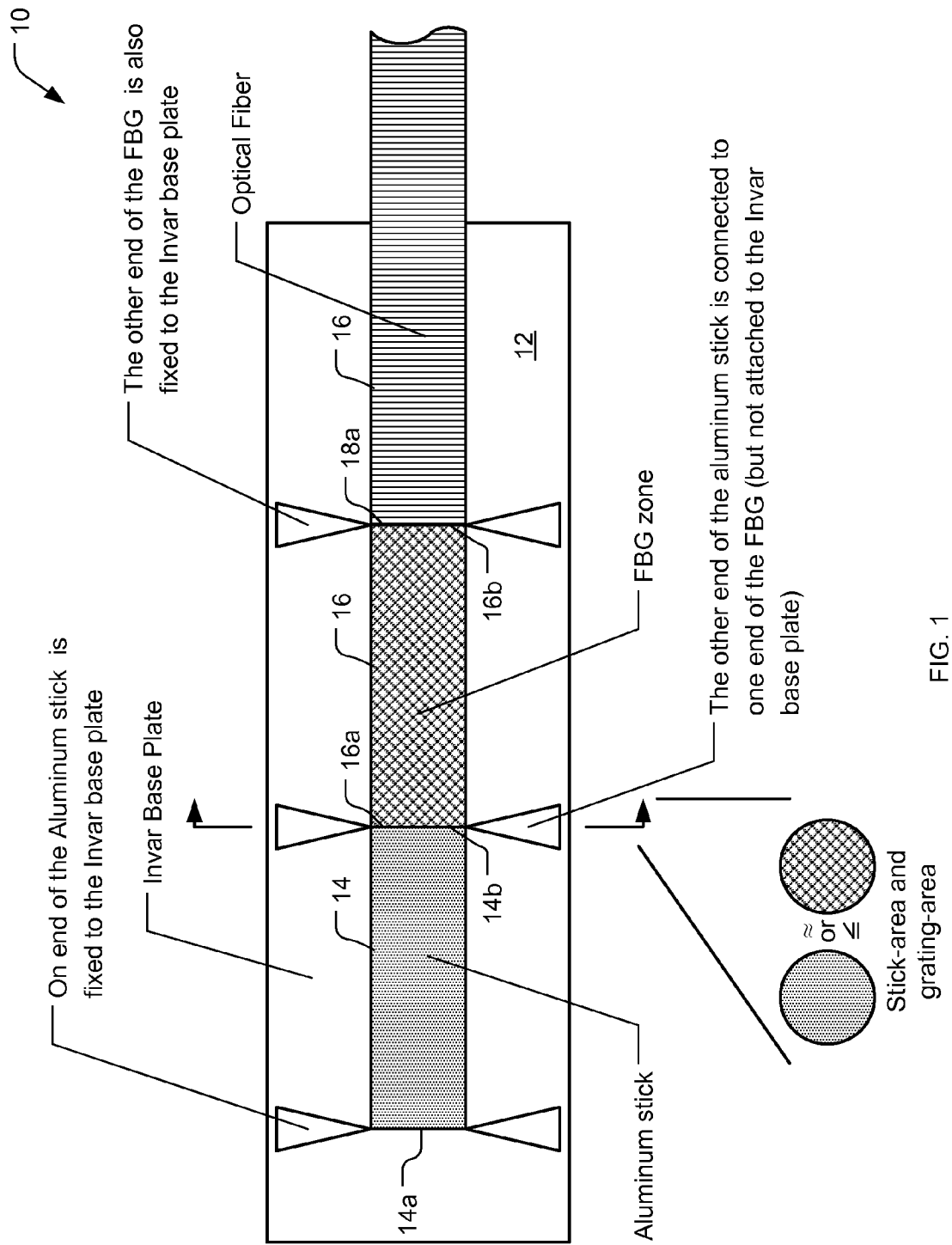
FIG. 1 is schematic block diagram of an athermal fiber Bragg grating ("AFBG") in accord with the present invention.

A preferred embodiment of the present invention is an athermal fiber Bragg grating ("AFBG"). As illustrated in the various drawings herein, and particularly in the view of FIG. 1, preferred embodiments of the invention are depicted by the general reference character 10.

In this invention, we propose an approach to minimize thermal expansion effects on a fiber Bragg grating ("FBG"). This approach combines multiple materials into one assembly to enable multiple thermal expansion coefficients to compensate among each other, and to thereby produce a near zero frequency shift through a wide temperature range, i.e., to produce an AFBG 10.

To simplify this explanation, an example of the AFBG 10 is used combining just three materials: Invar, aluminum, and a FBG attached or integral to an optical fiber. Of course, other embodiments that are fully in keeping with the spirit of the present invention can be constructed from other materials, or constructed using other quantities of elements with the same or other materials, or constructed in manners that will not necessarily resemble the embodiment presented here.

Conventional elements that will be used in applications of the inventive AFBG 10, such as laser light sources, photodetectors, signal processing circuitry, micro-processors, communications links, etc. have been omitted in the figures and in this discussion to prevent detract attention from the AFBG 10. Those of ordinary skill in the optical arts will appreciate that the range of potential applications for the invention is considerable, and that the conventional elements used or not used in any particular application should not imply any limitations on the underlying invention.

FIG. 1 is schematic block diagram of an AFBG 10 having a platform 12, a stick 14, a FBG 16, and an optical fiber 18. The platform 12 here is made of Invar, which has a near zero thermal expansion coefficient. In contrast, the stick 14 here is made of aluminum, which has a relatively substantial thermal expansion coefficient. The FBG 16 and the optical fiber 18 may essentially be made of any of the materials used for conventional optical fibers and fiber Bragg gratings. The FBG 16 may be integral to the optical fiber 18, of the same material and manufactured therein in the common manner used to manufacture many fiber Bragg gratings today, but this is not a requirement and the FBG 16 and the optical fiber 18 may also be discrete physical elements that have been bonded or operationally arranged together.

The aluminum stick 14 is attached at one end 14a to the Invar platform 12 and at the other end 14b to one end 16a of the FBG 16. It should be noted, however, that the connected ends 14b, 16a of the aluminum stick 14 and the FBG 16 are not attached to the Invar platform 12. The other end 16b of the FBG 16 is attached to one end 18a of the optical fiber 18. It should further be noted that the connected ends 16b, 18a of the FBG 16 and the optical fiber 18 are attached to the Invar platform 12.

The thermal expansion coefficients of aluminum and Invar are known to be 23 ppm and 0.8 ppm respectively. We can easily see that the thermal expansion of aluminum is higher than Invar. So, with the two ends 14a, 16b of the aluminum stick 14 and the FBG 16 as an assembly attached to the Invar platform 12, the low thermal expansion of Invar and the high thermal expansion of aluminum will effect the FBG 16. By choice of a proper length for the aluminum stick 14, an adequate stretching or compression can be produced to offset a thermal change to the FBG 16, in accord with Eq. 2 (set forth above).

In brief, our goal thus is to achieve the following condition:

$$a_{All} = (CTE_{FBG\_eff} \times L_{FBG} + CTE_{Invar} \times L_{Invar} - CTE_{aluminum} \times L_{aluminum})/L_{FBG} = 0,$$

where $CTE_{Aluminum} = 23$ ppm/° C.; $CTE_{Invar} = 0.8$ ppm/° C.; $L_{Aluminum} =$ length of aluminum stick 14; $L_{FBG}$ is the length of the grating zone, i.e., the FBG 16; and $L_{Invar} = L_{FBG} + L_{Aluminum}$.

Here we define $CTE_{FBG\_eff}$ as the "effective coefficient of thermal expansion," which equals the combined thermal expansion and refractive index variation per degree C, e.g., 10.6 ppm/° C. in the case calculated above based on the inventors' experiment.

For calculation purposes, we can use a typical length for the FBG 16, say, $L_{FBG} = 28.3$ mm, and insert this value into Eq. 3 to get $L_{aluminum} = 13.55$ mm.

Actual implementation, however, requires more considerations. For instance, attaching the ends 16a, 16b of the FBG 16 to the aluminum stick 14 and to the Invar platform 12 may require the use of adhesives, and the layers of adhesive then also have their own thermal expansion effects that need to be taken into consideration. The inventors have observed this effect and hence modified Eq. 3 to arrive at:

$$a_{All} = ((CTE_{FBG\_eff} - \epsilon_{glue}) \times L_{FBG} + CTE_{Invar} \times L_{Invar} - CTE_{aluminum} \times L_{aluminum})/L_{FBG} = 0.$$

The inventors have also observed that the $CTE_{eff}$ of the FBG 16 remains fairly constant in stretch mode, but less so in compression mode. To ensure that the forces of stretching and compression are co-linear during temperature increases and decreases the FBG 16 can be slightly pre-stretched. This avoids any transverse force at the joining of the FBG 16 and the aluminum stick 14, and maintains consistent accuracy in an AFBG 10 using this approach.

Another consideration may be the responsiveness of the AFBG 10 to temperature changes. The platform 12 is essentially athermal and, if desired, can easily be constructed so that the stick 14 and the FBG 16 are well exposed to the ambient temperature. The problem here, however, is that the stick 14 and the FBG 16 will inherently respond differently to temperature changes due to their desirably quite different thermal properties. The stick 14 will absorb or release thermal energy quickly and the FBG 16 will do so slowly.

The key to minimizing "thermal lag" here is the shape of the stick 14 (and how it is exposed to outside thermal energy, but that is easily set by platform/housing design). The FBG 16 is inherently small and cylindrical, typically being a short FBG zone that is an integral part of the optical fiber 18. As such, the FBG 16 is fixed and is a relatively small thermal reservoir with pretty much its maximum possible surface area presented. Yet with the limitations in capacity and flow rate yet this presents we still want to thermally "fill or empty" both the stick 14 and the FBG 16 in lock step. Since the stick 14 is not particularly limited, however, its capacity and/or its flow rate can be changed largely as desired. The thermal energy flow rate of for the stick 14 can be handled by making it cylindrical and long (hence the label "stick" herein) and the thermal energy capacity of the stick 14 can be handled by making it equal or smaller in diameter than the FBG 16.

Note, this is in marked contrast to many prior art schemes, wherein large amounts of materials like aluminum are used in elements with large surface areas relative to the FBG being athermalized. Worse, in many of these prior art schemes the large surface areas of the athermalizing compensation elements are more exposed to external energy that the FBG element, often fully housing it. It follows that the thermal lag in such devices can be appreciable, making them poorly suited for applications where rapid temperature change may occur.

Figure 2:
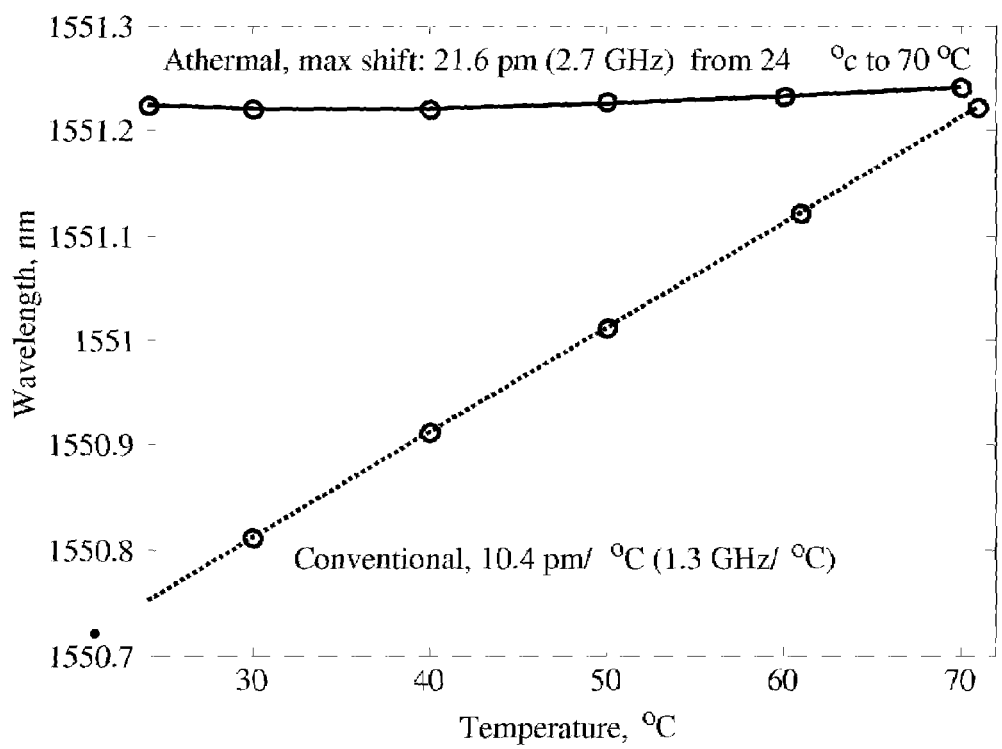
FIG. 2 is a graph of temperature response in an exemplary fiber Bragg grating ("FBG") both before and after conversion to an AFBG.

FIG. 2 is a graph of temperature response in an exemplary FBG, say, FBG 16 both before and after conversion into an AFBG 10. As can be seen, the AFBG 10 is rendered essentially athermal in comparison to the FBG 16 alone.

As already noted in passing, there are other materials that can be used for the platform 12 (e.g., Zerodur and ULE (Titanium Silicate) both are known for having low thermal expansion coefficients). The choice of material for the platform 12 usually will depend on an actual installation environment. For example, if an AFBG 10 is to be used in an indoor environment, where there is not heavy traffic or a likelihood of abuse that might cause breakage, materials line Zerodur or ULE will be perfectly fine in most cases. On the other hand, if an AFBG 10 is going to be installed in an outdoor or high-activity site, breakage of Zerodur or ULE can be a concern and Invar will typically be a better choice. Of course, the material in the stick 14 is also not limited to aluminum. Basically, any combination of materials that satisfies Eq. 4 will work to reduce the thermal effect on an FBG 16.

Using an adhesive to attach the aluminum stick 14 or the FBG 16 to the Invar platform 12 is also just one of the possible approaches. For instance, mechanical attachment can be used instead, as long as slippage does not occur and the resulting assembly is characterized by temperature effect repeatability.

The form factor of the high thermal expansion material, i.e., the "stick", can be any shape so long as it fulfills the function that one end is attachable to the low thermal expansion material, i.e., the "platform", and the other end is attachable to the FBG 16. For example, the "stick" (stick 14, generically) can be hollow along its longitudinal axis so that the optical fiber 18 can pass through (with the FBG 16 being at some mid-point in the optical fiber 18) (see e.g., FIG. 4). Or vice versa, the low thermal expansion platform 12 can be in any shape so long as it is attachable to the FBG 16 and the high thermal expansion stick 14. For example, the "platform" (platform 12, generically) can be a hollow tube which allows the combined stick 14 and FBG 16 assembly to be inserted into the hollowed space and filled with adhesive at both ends 14a, 16b. This makes it very easy for mounting or assembling the AFBG 10 into other structures.

With the athermal property established, we now discuss a few example applications. The AFBG 10 can be used for stabilizing laser frequency, referencing an unknown laser frequency, or measuring strain or compression forces applied to an object. The stabilization of laser frequency or use as a frequency reference is straightforward, but the measurement of strain or compression will require additional modification to the platform 12 if the applied force is not within the range of the AFBG 10.

For the stabilization of laser frequency or use as a frequency reference, the AFBG 10 can combined with a Fabry-Perot filter so that a periodical reference spectrum can be established. In this role the AFBG 10 can be designed to adjust its spacing to establish an "optical ruler".

Figure 3A:
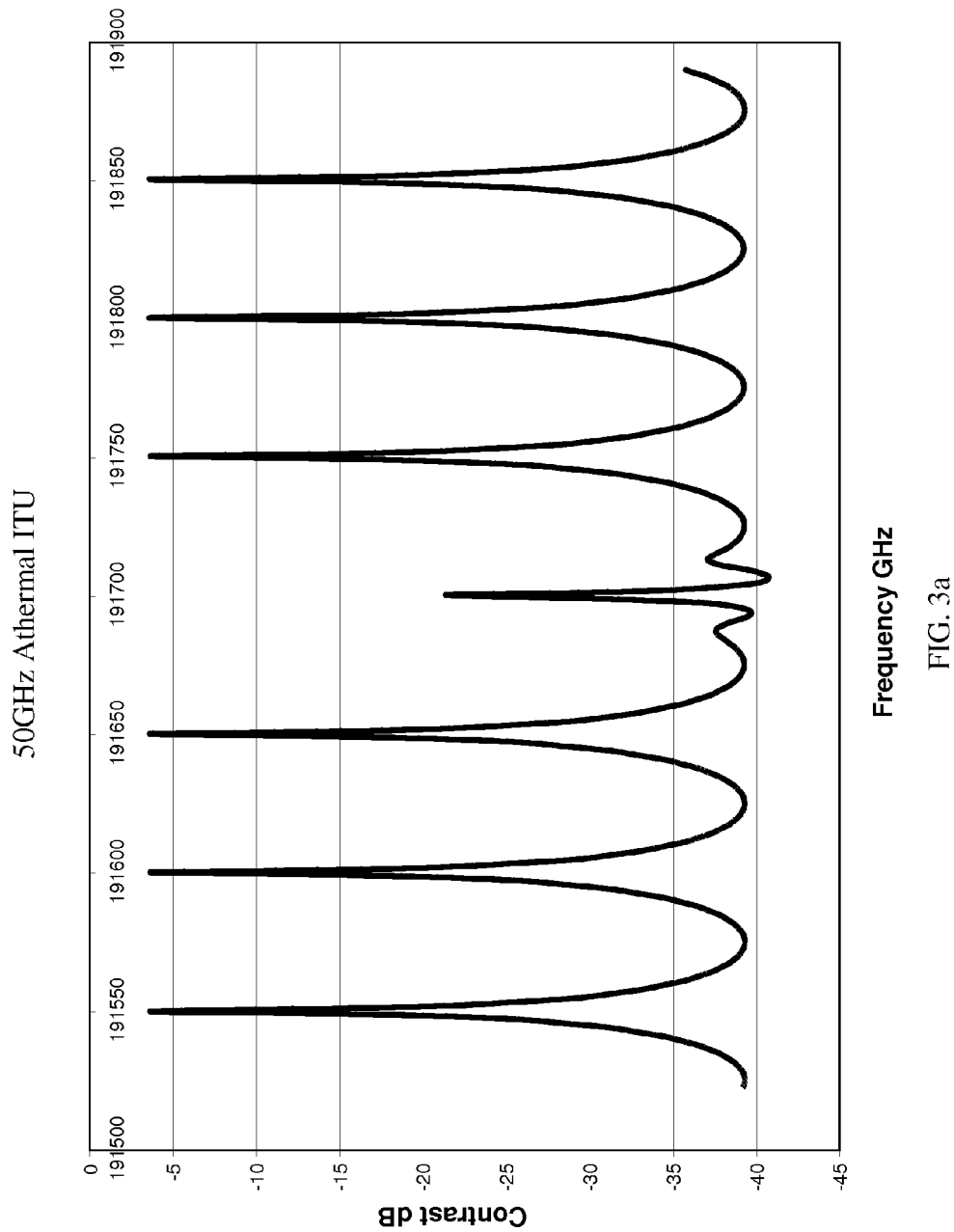
Figure 3B:
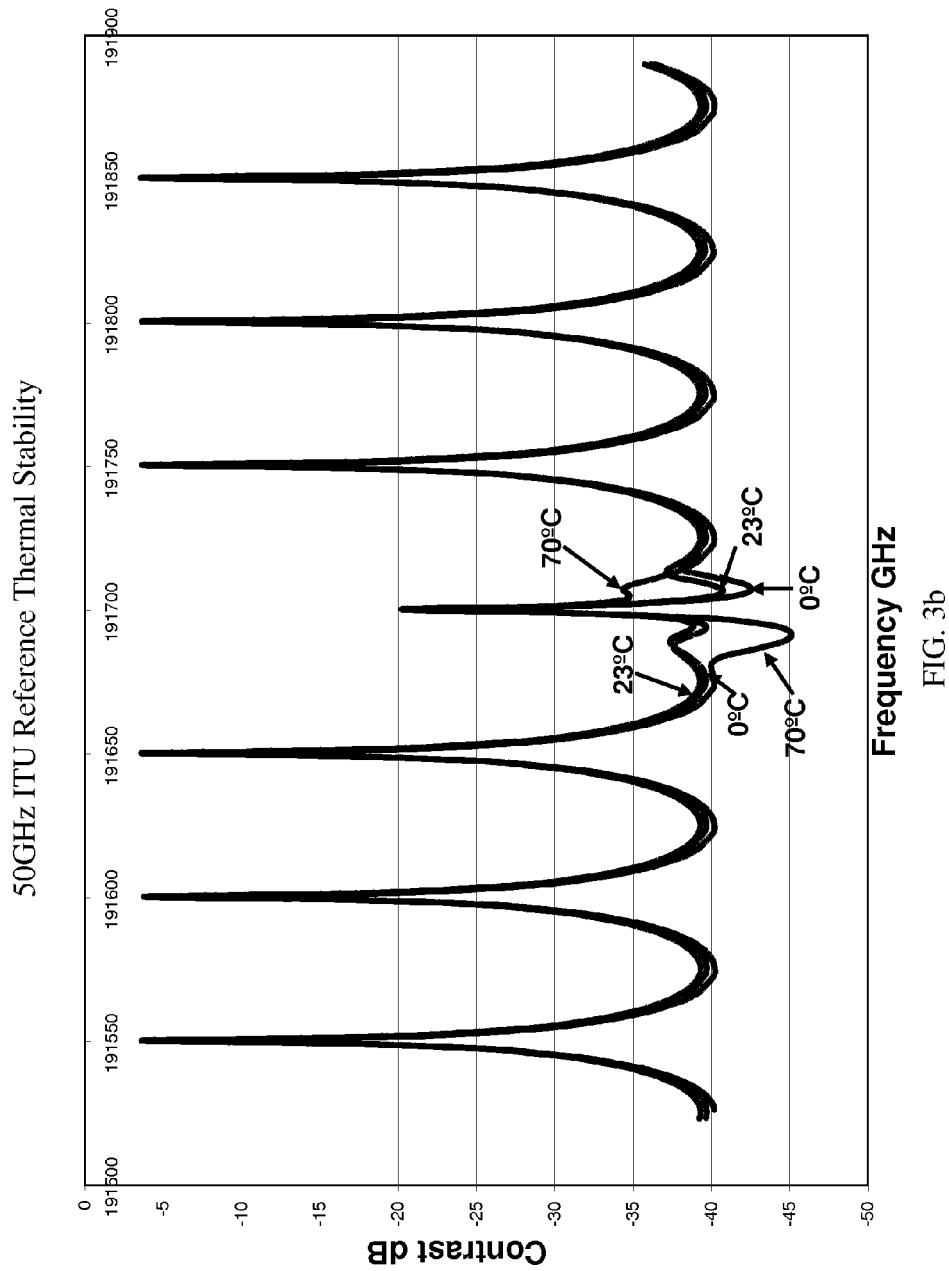

FIG. 3a–b are graphs illustrating the results of such an optical ruler. FIG. 3a shows an AFBG 10 with a central frequency of 191,700 GHz connected with an athermal Fabry-Perot ITU filter with 50 Ghz channel spacing, and FIG. 3b shows the thermal stability of the AFBG 10 in this role. As can be seen, the resulting spectrum is accurately aligned to the ITU grid and will be virtually unaffected by temperature variations. The AFBG 10 in this type of athermal frequency reference therefore exhibits advantages over the conventional gas cell method by providing accurate, repetitive referencing points and easy calibration. Some suitable laser stabilizing and reference applications for this, without limitation, include frequency referencing, frequency locking, and filtering for use in lasers and instruments. In particular, the AFBG 10 is useful as a reference for fast scanning tools, instruments, and monitors.

Figure 4:
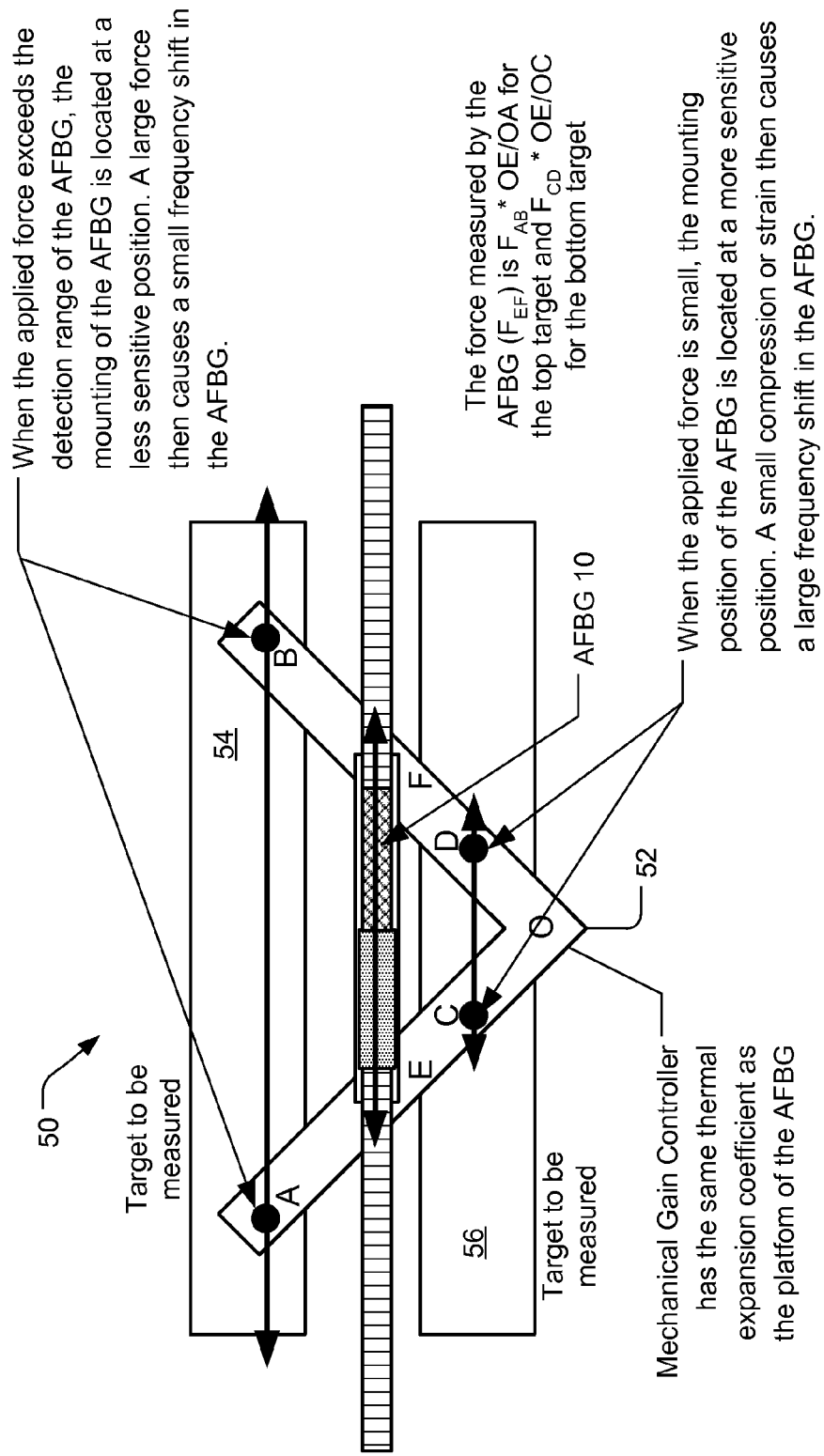
FIG. 4 is a schematic block diagram of a mechanical gain controller ("MGC") suitable to extend the capabilities of an AFBG for use in measuring strain or compression forces.

FIG. 4 is a schematic block diagram of a mechanical gain controller (MGC 50) suitable to extend the range of capabilities of an included AFBG 10 when measuring strain or compression forces. The MGC 50 brings an applied force within the detection range of the AFBG 10 in a manner somewhat equivalent to how an automatic gain controller (AGC) is used in an electronic circuit, except that the operation here is performed mechanically with a physical sub-assembly rather than automatically with an electronic sub-circuit. The AFBG 10 is mounted on a base 52 that reduces or increases the amount of force applied to the AFBG 10. In FIG. 4 the AFBG 10 is mounted to the base 52 at points E and F. The MGC 50 can then be mounted to a first target 54 at points A and B, or mounted to a second target 56 at points C and D. The base 52 further includes a point O, which is described presently.

The range of the AFBG 10 is "adjusted" by mounting the MGC 50 carrying it to one side of the normal position if the force that is expected will be too high, and to the other side if the force that is expected will be too low for the AFBG 10 to handle. The AFBG 10 is mounted at the normal position in the embodiment shown, i.e., at points E and F. The MGC 50 can instead be attached to the first target 54, as shown at points A and B, when a force is expected to be applied that is greater than the detection range of the AFBG 10. Conversely, the MGC 50 is attached to the second target 56, as shown at points C and D, when a force is expected to be applied that is lower than the detection range of the AFBG 10. The force measured by the AFBG 10 in these arrangements is proportional to the ratio of the mounting of the AFBG 10 and the target 54, 56. Of course, mounting the MGC 50 to a target at points E and F provides no range adjustment.

The MGC 50 performs best if the material of the base 52 is the same as the material of the platform 12 in the AFBG 10. This follows because incompatibility of the thermal expansion coefficients between the platform 12 of the AFBG 10 and the base 52 of the MGC 50 will produce strain or compression falsely to the AFBG 10 and result in error.

With reference now to both FIGS. 1 and 4, FIG. 1 shows the optical fiber 18 ending at the FBG 16 and FIG. 4 shows the optical fiber 18 extending onward, through the stick 14. Whether the optical fiber 18 (or two optical fibers 18) are used in this manner is a matter of design choice for a particular application. For example, multiple instances of the AFBG 10 and be connected in a serial, "daisy change"

arrangement this way. When this is the case, the stick 14 can be shaped as a hollow tube as represented in FIG. 4. Of course, other shapes than a solid cylinder (FIG. 1) or a tube (FIG. 4) are possible, but these shapes facilitate handling temperature changes, as described above.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

What is claimed is:

1. An athermal fiber Bragg grating assembly, comprising:
   a platform of a first material having a first coefficient of thermal expansion ($\alpha_1$) between first and second attachment locations defining an attachment-length ($L_1$) there between;
   a stick of a second material having a second coefficient of thermal expansion ($\alpha_2$) between first and second ends defining a stick-length ($L_2$) there between; and
   a fiber Bragg type grating of a third material having an effective third coefficient of thermal expansion ($\alpha_3$) between first and second ends defining a grating-length ($L_3$) there between, wherein said effective third coefficient ($\alpha_3$) is based on a combination of thermal expansion and refractive index variation in said grating with respect to temperature; and wherein:
   said second end of said stick is fixed to said first end of said grating, said first end of said stick is fixed to said first attachment location, and said second end of said grating is fixed to said second attachment location;
   said stick has an essentially same cross-sectional stick-area exhibited along said stick-length, said grating has a cross-sectional grating-area at its said first end, and said stick-area is equal to or less than said grating-area; and
   said coefficients ($\alpha_1$, $\alpha_2$, and $\alpha_3$) and said lengths ($L_1$, $L_2$, and $L_3$) are such that the assembly exhibits an effective overall coefficient of thermal expansion ($\alpha_{ALL}$) in accord with the equation:

$\alpha_{ALL} = (\alpha_1 * L_1 + \alpha_3 * L_3 - \alpha_2 * L_2)/L_3 \approx 0$.

2. The assembly of claim 1, wherein said platform encloses said stick and said grating.

3. The assembly of claim 1, wherein said stick and said grating are held in a pre-stressed state between said first and second attachment locations.

4. The assembly of claim 1, wherein said first material is such that said first coefficient of thermal expansion ($\alpha_1$) is lower than said third coefficient of thermal expansion ($\alpha_3$).

5. The assembly of claim 1, wherein said second material is such that said second coefficient of thermal expansion ($\alpha_2$) is substantially higher than said third coefficient of thermal expansion ($\alpha_3$).

6. The assembly of claim 1, wherein said first material is one of Invar, Zerodur, or Titanium Silicate (ULE) and said second material is aluminum.

7. The assembly of claim 1, further comprising an optical fiber having an end coupled to either said first or second end of said grating such that light can pass between said optical fiber and said grating.

8. The assembly of claim 7, wherein said grating is integrally manufactured at said end of said optical fiber.

9. The assembly of claim 1, further comprising a Fabry-Perot filter situated to receive and filter light to either said first or second end of said grating.

10. The assembly of claim 1, further comprising a mechanical gain controller having a plurality of paired sets of mounting points whereby the assembly is mounted at one said paired set of mounting points and force can be applied to said gain controller at one said paired set of mounting points.

11. The assembly of claim 10, wherein said gain controller is also of said first material, thereby also having said first coefficient of thermal expansion ($\alpha_1$).

12. A method for athermalizing a fiber Bragg grating, comprising:
   providing a platform of a first material having a first coefficient of thermal expansion ($\alpha_1$) between first and second attachment locations defining an attachment-length ($L_1$) there between;
   providing a stick of a second material having a second coefficient of thermal expansion ($\alpha_2$) between first and second ends defining a stick-length ($L_2$) there between;
   defining the grating as being of a third material having an effective third coefficient of thermal expansion ($\alpha_3$) between first and second ends defining a grating-length ($L_3$) there between, wherein said effective third coefficient ($\alpha_3$) is based on a combination of thermal expansion and refractive index variation in the grating with respect to temperature;
   affixing said second end of said stick to said first end of the grating, affixing said first end of said stick to said first attachment location, and affixing said second end of the grating to said second attachment location;
   providing that said stick has an essentially same cross-sectional stick-area exhibited along said stick-length, that the grating has a cross-sectional grating-area at its said first end, and that said stick-area is equal to or less than said grating-area; and
   providing that said coefficients ($\alpha_1$, $\alpha_2$, and $\alpha_3$) and said lengths ($L_1$, $L_2$, and $L_3$) are such that a resulting assembly of the grating, said stick, and said platform exhibit an effective overall coefficient of thermal expansion ($\alpha_{ALL}$) in accord with the equation:

$\alpha_{ALL} = (\alpha_1 * L_1 + \alpha_3 * L_3 - \alpha_2 * L_2)/L_3 \approx 0$.

13. The method of claim 12, further comprising enclosing said stick and said grating within said platform.

14. The method of claim 12, further comprising stressing said stick and said grating prior during said affixings at said first and second attachment locations so that they are held in a pre-stressed state there between.

15. The method of claim 12, further comprising coupling an optical fiber to either said first or second end of said grating such that light can pass between said optical fiber and the grating.

16. The method of claim 12, further comprising providing a Fabry-Perot filter situated to receive and filter light to either said first or second end of the grating.

17. The method of claim 12, further comprising:
   providing a mechanical gain controller having a plurality of paired sets of mounting points where at force can be applied to said gain controller; and
   mounting said assembly at one said paired set of mounting points.

18. An athermal fiber Bragg grating assembly, comprising:
   platform means for providing first and second attachment locations defining an attachment-length ($L_1$) there between, wherein said platform means is of a first material having a first coefficient of thermal expansion ($\alpha_1$);

stick means for providing first and second ends defining a stick-length ($L_2$) there between, wherein said stick means is of a second material having a second coefficient of thermal expansion ($\alpha_2$); and a fiber Bragg type grating having first and second ends defining a grating-length ($L_3$) there between, wherein said grating is of a third material having an effective third coefficient of thermal expansion ($\alpha_3$) that is based on a combination of thermal expansion and refractive index variation in said grating with respect to temperature; and wherein:

said second end of said stick means is fixed to said first end of said grating, said first end of said stick means is fixed to said first attachment location, and said second end of said grating is fixed to said second attachment location;

said stick means has an essentially same cross-sectional stick-area exhibited along said stick-length, said grating has a cross-sectional grating-area at its said first end, and said stick-area is equal to or less than said grating-area; and said coefficients ($\alpha_1$, $\alpha_2$, and $\alpha_3$) and said lengths ($L_1$, $L_2$, and $L_3$) are such that the assembly exhibits an effective overall coefficient of thermal expansion ($\alpha_{ALL}$) in accord with the equation:

$$\alpha_{ALL} = (\alpha_1 * L_1 + \alpha_3 * L_3 - \alpha_2 * L_2)/L_3 \approx 0.$$

19. The assembly of claim 18, further comprising Fabry-Perot filter means for receiving and filtering light to either said first or second end of said grating.

20. The assembly of claim 18, further comprising mechanical gain control means for providing a plurality of paired sets of mounting points where at force can be applied and mounting the assembly at one said paired set of mounting points.

* * * * *